Oct. 11, 1949.  J. E. DUBE ET AL  2,484,156
VALVE WITH DUAL CONTROL
Filed April 14, 1944
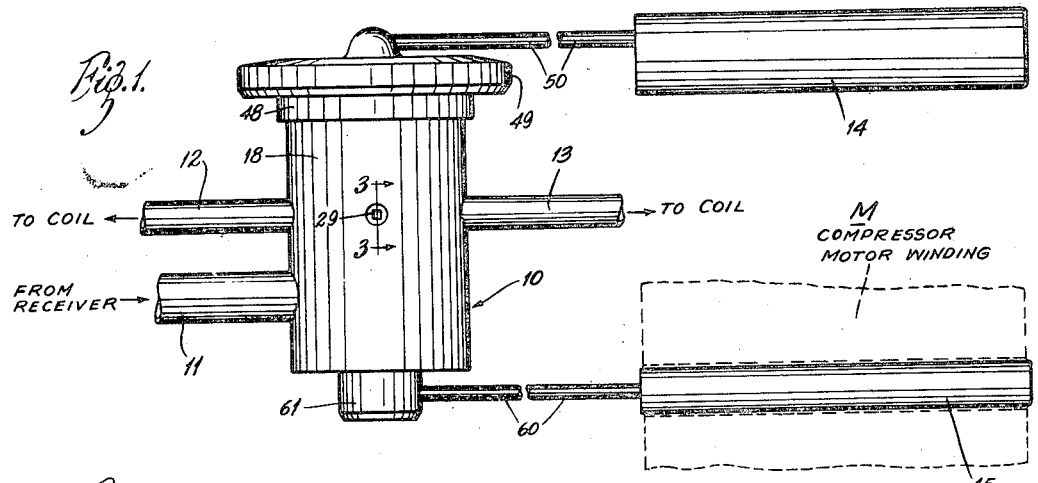
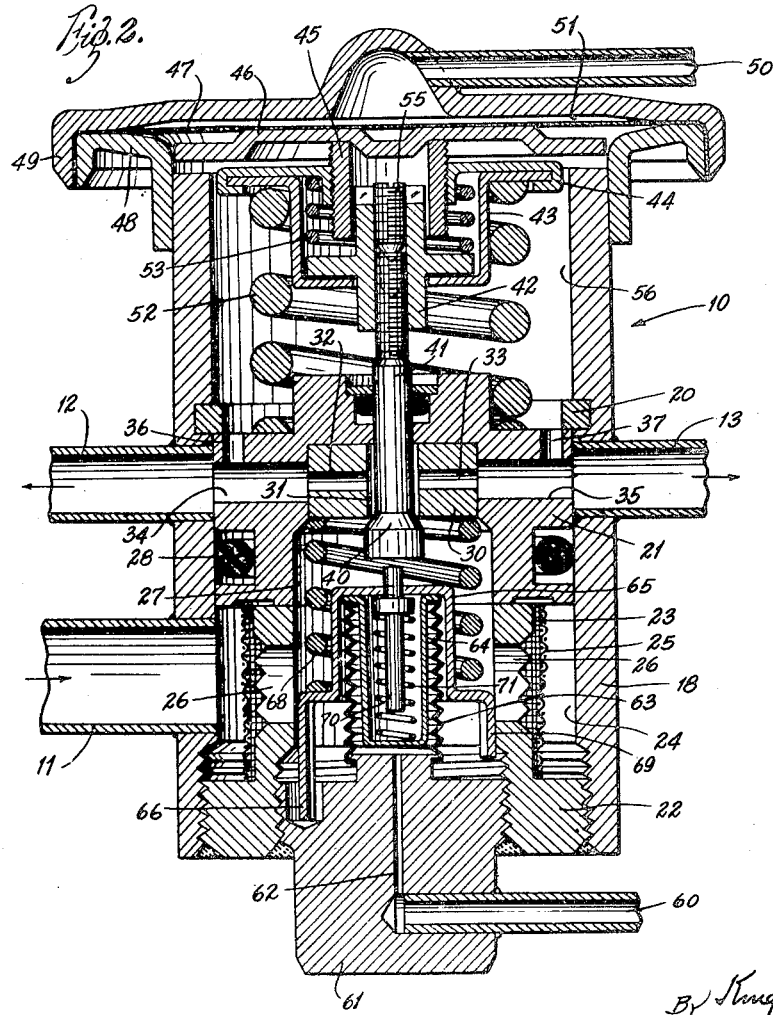
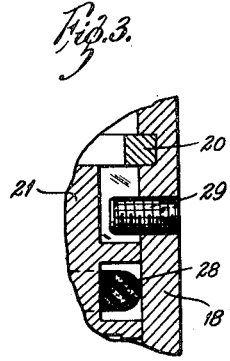
INVENTORS:
GEORGE D. BOWER,
JOHN E. DUBE,
ATTORNEYS.

Patented Oct. 11, 1949

2,484,156

UNITED STATES PATENT OFFICE 2,484,156

VALVE WITH DUAL CONTROL

John E. Dube, Clayton, and George D. Bower, University City, Mo., assignors to Alco Valve Company, University City, Mo., a corporation of Missouri Application April 14, 1944, Serial No. 531,020

13 Claims. (Cl. 62—2)

The present invention relates to a valve with a dual control, or some analogous cut-off or regulating device with a dual control, one of which controls overrides the other.

It is an object of the invention to provide a regulating device, such as a valve, that is moved between limits by a first control device, together with a second control device that adjusts one of the limits, overriding the first control device only insofar as it tends to cause the regulating device to move beyond the limit, without altering the operation of the device within its full range of operation below said limit.

It is an object of the invention to provide a valve that is normally positioned in response to certain changes in physical conditions, such as changes in the temperature of a refrigerating medium, together with means acting in opposition to said first condition-responsive device to override the same and position the valve in response to another physical condition, or to limit the displacement of the valve by the first condition-responsive device.

A particular object is to provide in a single valve for use with a motor driven system, wherein the motor is subject to overload, a first temperature responsive control, and a second overriding thermal control operating in response to temperature of the motor windings in opposition to the first temperature control when the motor windings heat excessively.

A further object is to provide, in a single valve mechanism, a valve, a main thermal control therefor, and an overriding thermal control, and to employ said mechanism in a motor driven refrigeration system wherein the valve acts as the expansion valve, under principal control of the main thermal control, and under auxiliary control of the second thermal control which is disposed to be responsive to motor winding temperature and to throttle the valve as the temperature of the motor windings increases beyond normal limit.

An additional object is to provide a valve, a first automatic control therefor, a second overriding automatic control therefor, and a lost motion connection between the second overriding control and the valve.

A further object is to provide a valve of this kind into which the parts may be quickly and readily assembled, preferably principally from one end. A further object is to provide parts that may be made largely of stampings, and correspondingly inexpensive methods of fabrication.

In the foregoing object and in the description to follow, reference is made particularly to temperature operated controls. It is fairly evident that features of the invention may be used with controls responsive to other physical changes, such as pressure changes, and that actuated devices other than valves may be used. An example of the latter is an electric switch. However, it will appear that particular advantages are present in connection with refrigeration control valves.

In the drawings:

Fig. 1 is a side elevation of the mechanism, showing how it is used in a refrigeration system;

Fig. 2 is a vertical medial section through the valve; and

Fig. 3 is a partial section taken on the line 3—3 of Fig. 1.

The apparatus is described and illustrated in connection with a refrigeration system, with which it is particularly useful, although it is not limited thereto. It consists of a valve mechanism, generally indicated at 10, for controlling the flow of fluid from an inlet 11 to one or more outlets 12 and 13. The valve mechanism 10 is under control of two expansible devices responsive to changes in physical conditions, as will be described in detail hereafter. In the illustration, these devices include two bulbs 14 and 15, the latter of which is shown as disposed in proximity to motor windings M of the motor used to drive the refrigeration system.

The valve apparatus 10 includes a housing 18, generally cylindrical, and of a plain shape easy to fabricate. The inlet 11 opens through the side wall of the housing 18 toward the bottom thereof, and one or more outlets 12 and 13, in such number as is needed, radiate from the housing about midway along the length thereof.

Shortly above the outlets 12 and 13 a groove in the inner wall of the housing 18 is adapted to receive a split snap-ring 20. This ring 20 forms an abutment against which a distributing head 21, shaped to slide into the housing 18 from the bottom, fits and is held. A hollow closure 22, threadedly engaged with the lowest part of the inner wall of the housing 18, has an upstanding cylindrical portion 23 that contacts the bottom part of the distributing head 21 to secure the same in place against the ring 20. The portion 23 has a band of peripheral grooves about its outer surface. The foregoing parts provide an inlet chamber 24 between the upstanding portion 23, the bottom of the distributing head 21, and the inner surface of the housing 18, into which chamber the inlet 11 communicates. A screen or other filter 25 surrounds the upstanding part 23 of the member 22, and filters the fluid passing from the chamber 24 through radially disposed ports 26 in the part 23, into an inner valve chamber 27, formed in part in the projection 23 and continued into the distributing head 21. The grooved outer surface of the portion 23 insures that the entire filter area may be used, even if the filter binds closely around the said surface.

It will be observed that all of the parts thus far mentioned may be readily inserted into the housing 18 from the bottom. A rubber or like packing ring 28 is disposed in a groove around the head 21 to seal off the chamber 24 from the outlets 12 and 13. As shown in Fig. 3, a screw 29 is threaded through the housing 18, and engages in a short vertical groove in the head 21, to prevent rotation thereof within the housing.

A distribution port member 30 fits snugly within an extension of the valve chamber 27, in the distributing head 21. The member 30 has a central vertical port 31 from which radiate a plurality of distribution ports 32 and 33, there being one of the latter for each of the outlets 12, 13, etc. The ports 32 and 33 are connected by larger ports 34 and 35, respectively, in the head 21, with the still larger outlets 12 and 13. Equalizer openings 36 and 37 connect the ports 34 and 35 with the space within the housing above the distributing head 21.

Flow from the inlet 11 and the valve chamber 27 to the port 31, the distributing ports 32 and 33, and ultimately the outlets 12 and 13, is under control of a valve 40 within the valve chamber 27 and acting to control the size of the opening into the vertical port 31. The valve 40 is on a stem 41 that extends upwardly through the port 31, through the top of the distributing head 21 (with a suitable packing ring, as shown), to a flanged collar 42 into which it is adjustably threaded. The collar 42 is disposed within a cup-shaped member 43 that, in turn, is secured to an annular disc 44. It will be seen that the disc 44 has its edges turned over the edges of the cup-shaped member 43 to provide a secure but inexpensive conjunction of the two pieces.

The disc 44 has an upstanding central threaded boss, receiving a threaded collar 45, that, in turn, abuts a disc 46 that engages a diaphragm 47, clamped between a flange 48 on the housing 18 and a cap 49 closing the top of the housing. The cap 49 receives a tube 50 connected to the bulb 14 and provides a pressure chamber 51 above the diaphragm.

A strong coil spring 52 engages the flange on the cup-shaped member 43 to urge this member, the attached disc 44, the collar 45, and the disc 46 against the diaphragm 47, to oppose downward movement of the diaphragm 47 with a predetermined force. It will be observed further that a lighter coil spring 53 acts within the cup-shaped member 43 to urge the flanged collar 42 downwardly to the limit permitted by the bottom part of the cup-shaped member 43. Thus the valve 40 will be opened when the diaphragm moves downwardly against the spring 52, but it may be closed regardless of the downward position of the diaphragm, through compression of the spring 53. The particular calibration of the valve 40 is determined by its threaded engagement with the collar 42, and its position is set by a lock screw 55.

The diaphragm 47, the upper part of the housing 18, and the top of the head 21, form a lower diaphragm chamber 56, which is at outlet pressure, due to the ports 36 and 37.

The valve 40 is under the overriding control of an additional temperature responsive device including the bulb 15. This bulb is connected by a tube 60 with a plug 61 threaded into the bottom of the closure member 22. The tube 60 communicates with a port 62 leading to the interior of a sealed bellows 63 disposed within the valve chamber 27. One end of the bellows 63 is secured to the plug 61 and the other end is secured to the flange of a cup-shaped member 64 that fits within a major part of the bellows 63 and limits the volume and amount of collapse thereof. An inverted cup member 65 engages over the upper end of the bellows and the member 64. The cup member 65 has a leg 66 depending into an opening in the cap 61 to prevent rotation of the member. Axial movement of the cup member is under the influence of the bellows 63 and a coil spring 68. The spring 68 engages the flange on the cup member 65 and the distribution port insert 30, so that it holds the latter in place and provides a predetermined force acting in opposition to expansion of the bellows. Wobbling of the cup member 65 is prevented by the presence of the leg 69 opposite the leg 66. Both legs engage the inner walls of the upstanding portion 23 through a sufficient axial and peripheral distance to hold the cup-shaped member 65 steady.

An actuating member 70 fits within the member 64 and is urged upwardly by a spring 71. The member 70 is adapted to engage the valve 40 and to force the same to closed position under circumstances to be described.

In assembling the mechanism, the upper flange 48, the diaphragm 47, the cover 49 and the disc 46 may be put into place from the upper side. Then the snap-ring 20 is inserted from the bottom of the housing 18 and located in its groove. Thereafter an assembly is made consisting of the distributor head 21 with its insert 30, the valve 40, the cup-shaped member 43 and all of its associated elements, including the spring 52; and this assembly is inserted to engage the collar 45 against the disc 46, to compress the spring 52, and to bring the distributor head 21 against the snap-ring 20. These parts are secured in position by the insertion of the closure 22. Thereafter the override assembly attached to the plug 61 may be threaded into place.

The order of installation of the parts is not critical, and the foregoing is merely to give a demonstration of the simplicity with which the assembly may be made.

Operation

Illustrating the use of the valve mechanism by reference to the temperature control of a refrigeration system, the bulb 14 is located at some point representative of the temperature of the space to be controlled. The bulb 15 is located so as to be responsive to changes in temperature of the windings of the motor supplying the power for operating the compressor or like element of the refrigeration system. The inlet 11 leads from the receiver of the system and the outlets 12 and 13, in whatever number required, lead to the individual coils used. As is well known, the coils are connected back into the compressor.

The normal positioning of the valve 40 is controlled by the resultant of the pressure in the chamber 51 above the diaphragm 47, and the opposing pressures of the spring 52 and the pressure within the chamber 56 below the diaphragm. If at a condition of pressure equilibrium, there occurs a change in the pressure in the chamber 51, it will produce a corresponding change in the position of the valve 40. This will result in changes in the pressure in the chamber 56, and a new equilibrium position of the valve will result, in which the two pressures below the diaphragm once again balance the pressure above the diaphragm. When the bulb 14 is located so as to reflect superheat temperatures in a refrigeration evaporator, and the valve is the expansion valve, the mechanism will maintain a constant superheat.

Thus the position of the valve is a function of the pressures generated in the system including the bulb 14, and the amount of refrigerant flowing into the coils is governed by the bulb 14. The pressure in the bulb 14 is a function of the temperature around the bulb.

When the valve 40 is open, it may be closed upon increase of the fluid pressure within the bellows 63 to beyond a critical amount, regardless of the condition at the bulb 14. Such increase acts within the bellows 63 to expand the same and cause upward movement of the member 65 against the force of the spring 68. After an amount of movement in the foregoing manner determined by the degree of opening of the valve 40, the actuating member 70 will be caused to impinge upon the bottom of the valve 40. The spring 71 produces a force acting to close the valve 40 that is greater than the opposing force of the spring 53, so that the valve 40 is closed despite the fact that the main diaphragm 47 is in a position to have the same open.

In the mechanism shown, the pressure generated within the bellows 63 is a function of the temperature at the bulb 15. This bulb is shown as located so as to reflect the temperature of the compressor motor windings, and thereby to reflect any amount of overload on the compressor motor.

An excessive demand for refrigeration may result in an overload of the compressor motor, and increase in its winding temperatures. The throttling down of the valve 40 by the over-riding control reduces the delivery of refrigerant through the system to a quantity within the proper capacity of the motor. This throttling, it will be seen, does not completely stop the system, as happens with a circuit breaker cut-out.

The valve 40 has here been shown as the expansion valve of the system. To this end, the passage 31 is small and the ports 32 and 33 are likewise relatively small, and all provide a space that is confined so as to restrict the separation of the gases, and to provide even distribution and uniform composition of the refrigerant among the several outlets.

The mechanism has been illustrated as an override for a thermal valve in a refrigeration system, wherein excessive temperature of the motor windings effects increase in pressure tending to close the valve, thereby reducing the load on the motor regardless of demand for refrigeration.

However, in its broader aspect, the mechanism provides a regulating device that is positioned between two extremes by a first control device, combined with a second control device that adjusts one of the extremes, overriding the first control device when it attempts to exceed the limit set by the second. In so doing, the second control device does not alter the operation of the regulating device by the first control below the limit set by the second control.

An illustration of the use of this type of mechanism in the aforesaid broader sense would be as a fuel valve, wherein the main bulb 14 modulates the fuel supply in accordance with the heat demand at a space being heated, and the bulb 15 provides an adjustable limit thereon, in response to some other temperature condition such as bonnet or water temperature.

It will be evident that the mechanism is fully capable of other applications, and that it is not limited to response to temperature changes. It is at once evident that the diaphragm and bellows here respond directly to pressure changes, and indirectly to temperature changes, since temperature changes are used as the means to generate pressure changes.

It is also evident that many changes in construction could be made without departing from the inventive concepts hereof.

What is claimed is:

1. A method of controlling a refrigeration system having a power means that effects the circulation of refrigerant through the system, and a valve for controlling the flow of the refrigerant in the system, comprising the steps of positioning the valve automatically in response to a normal demand for refrigeration, and overriding the positioning of the valve as accomplished by the initially defined step and automatically throttling it toward closed position when the refrigeration demand exceeds the capacity of the power means.

2. In a mechanism of the kind described for use with a refrigeration system having a power device, the combination of a refrigeration valve, a first thermal device for operating the valve into an open position in response to demand for refrigeration, and a second thermal device for operating the valve toward closed position by overriding the operation of the first thermal device, said second thermal device being responsive to an overload of the power device of the refrigeration system.

3. In a valve for use in a refrigeration system, which system has a motive unit subject to overheating upon overload, the combination of a valve, a first means to position the valve in accordance with load demand upon the refrigeration system and to move the valve toward open position upon increase in such demand, means including a thermostatic device adapted to be located to respond to the temperature changes of the motive means, and a second means controlled by said thermostatic means and operative to override the valve positioning control effected by said first means.

4. In a valve mechanism for use with a refrigeration system having an electric motor and a winding therein, a valve adapted to be disposed in the refrigeration system to control expansion of the refrigerant therein, a first means to position the valve in response to load demands on the system, a temperature-responsive device movable in response to temperature changes and adapted to be disposed to respond to temperature changes of the motor winding, and means to apply the movements of the temperature-responsive device to the valve to move the same toward closed position upon excess temperature at the temperature-responsive device, despite demand by the first positioning means.

5. In a mechanism of the kind described, a housing having a cylindrical bore therein, a chamber having a movable wall across the first end of the bore, a device including a threaded collar, engageable by said wall to be moved thereby, a disc-shaped stamping having a central boss threaded onto the collar, a cup-shaped member having a flange joined to the periphery of the disc and forming with the disc a chamber, a flanged collar and a spring in the chamber, the spring urging the collar away from the movable wall, a valve stem threaded into the flanged collar, a distribution head having cylindrical outer surfaces interfitting with the inner wall of the housing, a snap ring engageable in a groove in the housing wall to form an abutment for the distribution head to limit its displacement toward the movable wall, a return spring between the device engaging the wall and the distribution head, the head having a bore therethrough through which the valve stem extends, a valve on the stem, seat means on the head including an insert installed from the side of the head opposite the snap ring, said seat means having a bore and radial distributing passages leading therefrom, a closure threaded into the second end of the housing, said closure having an upstanding flange spaced inwardly from the housing walls, and engaging the head to hold the same in place, an inlet chamber outside the flange, passages through the flange, a valve chamber inside the flange, an expansible member supported on the closure and movable toward the valve, a spring between the valve seat means and the expansible member, an actuating member between the valve and the expansible member, a spring urging the actuating member toward the valve, inlet means leading through the housing into the inlet chamber, and outlet means connecting with the radial distribution passages and leading through the housing.

6. In a refrigeration system having a compressor motor, a valve mechanism including a first power mechanism, a valve and a closure therefor with which the valve is cooperatable, the power mechanism comprising a movable wall device, thermally-responsive fluid pressure means acting upon one side of the wall device to open the valve in response to increase in said pressure, yieldable means acting oppositely on the movable wall device, and means to introduce fluid pressure from the outlet side of the valve to the wall device in opposition to the thermally-responsive fluid pressure means, whereby the movable wall device is adapted to position the valve in positions that are the net results of the thermally-responsive pressures, less the sum of the outlet side pressures and the forces of the yieldable means, a second power means having a thermal device responsive to winding temperature of the compressor motor, and a movable element operated by the thermal device, the element being movable in the path of movement of the valve by the first power mechanism, to limit the amount of opening thereof by the first power mechanism, without interfering with the cycling of the valve by the first power mechanism within the limits provided by the movable element.

7. A valve mechanism comprising a housing, a valve movable therein, a closure in the housing with which the valve cooperates, a first expansible and contractible member and a yieldable connection between the member and the valve for operating the valve toward and from its closure, a second expansible and contractible device, and a member positioned thereby, there being a yieldable connection between the second device and its member which connection is less yieldable than the first mentioned yieldable connection so that it can override the same, said member being normally outside the path of movement of the valve, whereby the valve is operated solely by the first expansible member, said member of the second expansible and contractible device being positionable by the second expansible device into the path of movement of the valve in amounts that are functions of the expansion and contraction of the second expansible device, thereby to limit the amount of movement of the valve by said first expansible member.

8. A valve mechanism including a housing having an inlet and an outlet, and an expansible wall at one end thereof, the opposite end having an opening therethrough, a removable element insertable through the opening, having a connection to the inlet, a valve seat, and a connection with the outlet, a valve device insertable through the opening cooperatable with the valve seat, and connectable with the movable wall, a spring between the removable element and the wall to oppose movement thereof, a closure means for the opening of the housing, an expansible chamber supported on the closure means, an element on the chamber movable into the path of movement of the valve, and means on the closure means to hold the removable, insertable element in place.

9. A valve mechanism including a housing having an inlet and an outlet, and an expansible wall at one end thereof, the opposite end having an opening therethrough, a removable element insertable through the opening, having a connection to the inlet, a valve seat, and a connection with the outlet, a valve device insertable through the opening cooperatable with the valve seat, and connectable with the movable wall, a spring between the removable element and the wall to oppose movement thereof, a closure means for the opening of the housing, an expansible chamber supported on the closure means, an element on the chamber movable into the path of movement of the valve, means on the closure means to hold the removable, insertable element in place, the valve seat being removable from the last named element, and means associated with the closure to hold the valve seat in the element.

10. A valve mechanism including a housing having an inlet and an outlet, and an expansible wall at one end thereof, the opposite end having an opening therethrough, a removable element insertable through the opening, having a connection to the inlet, a valve seat, and a connection with the outlet, a valve device insertable through the opening cooperatable with the valve seat, and connectable with the movable wall, a spring between the removable element and the wall to oppose movement thereof, a closure means for the opening of the housing, an expansible chamber supported on the closure means, an element on the chamber movable into the path of movement of the valve, and means on the closure means to hold the removable, insertable element in place, the valve seat being separate from the insertable element and applicable thereinto from the opening in the housing, a spring engageable against the valve seat and the expansible chamber to oppose movement of the chamber and to hold the valve seat in place.

11. A valve mechanism comprising a housing having an inlet and an outlet, a valve in the housing movable to regulate fluid flow from the inlet to the outlet, a first expansible and contractible means having a first pressure chamber wherein increase in pressure tends to displace the means in one direction, yieldable means opposing such movement, means to produce varying pressures in said chamber to effect positioning of the expansible and contractible means in varying positions that are functions of the pressure in said chamber, yieldable means connecting the valve to the expansible and contractible means for positioning of the valve as a function of the position of the said means; mechanism to throttle the valve in varying degrees, despite the condition of the first expansible and contractible means, including a second expansible and contractible device having an additional pressure chamber, and means to conduct a fluid under varying pressures thereto to move the device upon change of such fluid pressure, yieldable means opposing the said fluid pressure in the chamber whereby the second expansible and contractible device is positioned in various positions that are the function of the pressures in the additional chamber, a limiting device operated by the additional pressure chamber, the limiting device being positioned at various points in the path of movement of the valve to limit movement thereof only in one direction, whereby the valve may be operated by the first expansible and contractible means to the limit permitted by the particular position of the limiting device at any time, the yieldable connecting means between the valve and the first expansible and contractible means enabling the valve to be throttled by the throttling mechanism without changing the position of the first expansible and contractible means.

12. In a refrigerant expansion valve, a housing, an inlet and an outlet therein, a valve regulating refrigerant flow from the inlet to the outlet, a first expansible and contractible device having a first movable wall, yieldable means connecting said wall with the valve, temperature-responsive means to move the wall in a direction to open the valve in response to temperature change in one direction, the opposite side of the wall being connected with the low pressure side of the valve, which pressure acts to oppose movement of the wall by the temperature-responsive means, and spring means also acting in aid of the low pressure; and mechanism to throttle the valve, said mechanism being capable of enabling the valve to open only to limited amounts, said mechanism comprising a second expansible and contractible device having a second movable wall, an additional pressure chamber for moving the second wall in response to pressure conditions in the additional chamber, means to produce varying fluid pressures in said chamber, yieldable means acting on the second wall in opposition to the pressures in said additional chamber whereby the second wall is positioned as a function of the pressures in said additional chamber, means moved by said second wall into the path of movement of the valve by the first wall, said means comprising a limiting abutment engageable by the valve to limit its opening movement in response to increase in pressure in the first pressure chamber, said second wall being adapted to position the abutment in various positions with respect to the valve, whereby the first wall may operate the valve within the limits permitted by the abutment, but may not operate it further open than permitted by the abutment.

13. In a mechanism of the kind described, an actuatable element comprising a valve or the like adapted to be operated within a predetermined range of positions from a first extreme position toward a second extreme position, first control means having a device movable in response to changes in physical conditions, means connecting said device to the actuatable element to displace the actuatable element from its first extreme position into various positions within its range of operation, second control means having a second device movable in response to changes in other physical conditions, a limiting abutment element moved by the second device into varying positions within the range of movement of the actuatable element from the second extreme position toward the first extreme position of said element, said abutment being engageable with the actuatable element to limit its travel in only one direction of movement of the element, the means connecting the movable device of the first control means, and the actuatable element, being yieldably spring-like to normally maintain a predetermined spacing between the movable device and the actuatable valve, but to permit change of said spacing so that the first control means may freely position the actuatable element at any point within said range up to the abutment, without being influenced by the second control means, and so that the second control means can limit further movement of the element without influence by the first control means.

JOHN E. DUBE.
GEORGE D. BOWER.

REFERENCES CITED

The following references are of record in the file of this patent:

UNITED STATES PATENTS

| Number | Name | Date |
|---|---|---|
| 1,325,896 | Long | Dec. 23, 1919 |
| 1,586,798 | Hansen | June 1, 1926 |
| 1,678,658 | Thomas | July 31, 1928 |
| 1,932,269 | Harrington | Oct. 24, 1933 |
| 1,936,325 | Carson | Nov. 21, 1933 |
| 1,988,776 | Berghoefer | Jan. 22, 1935 |
| 2,025,603 | McDonald | Dec. 24, 1935 |
| 2,154,518 | Long | Apr. 18, 1939 |
| 2,200,477 | Newton | May 14, 1940 |
| 2,224,053 | Johnson | Dec. 3, 1940 |
| 2,259,280 | Wile | Oct. 14, 1941 |
| 2,318,721 | Siver | May 11, 1943 |
| 2,319,685 | Jackson | May 18, 1943 |
| 2,319,993 | Kaufman | May 25, 1943 |
| 2,366,188 | Gibson | Jan. 2, 1945 |